US008183815B2

(12) United States Patent
Krause et al.

(10) Patent No.: US 8,183,815 B2

(45) Date of Patent: May 22, 2012

(54) METHOD AND CONTROL DEVICE FOR AUTOMATICALLY DETERMINING A MASS OF A DOOR SYSTEM

(75) Inventors: Uwe Krause, Pattensen (DE); Heinz Ludwig, Garbsen (DE); Uwe Nolte, Barsinghausen (DE); Guido Sonntag, Gehrden (DE)

(73) Assignee: Siemens Aktiengesellschaft, München (DE)

( * ) Notice: Subject to any disclaimer, the term of this patent is extended or adjusted under 35 U.S.C. 154(b) by 547 days.

(21) Appl. No.: 12/083,754

(22) PCT Filed: Oct. 12, 2006

(86) PCT No.: PCT/EP2006/067337

§ 371 (c)(1), (2), (4) Date: Sep. 22, 2009

(87) PCT Pub. No.: WO2007/045596

PCT Pub. Date: Apr. 26, 2007

(65) Prior Publication Data

US 2010/0013425 A1 Jan. 21, 2010

(30) Foreign Application Priority Data

Oct. 18, 2005 (DE) ......................... 10 2005 050 125
Sep. 19, 2006 (DE) ......................... 10 2006 043 896

(51) Int. Cl.
*B25J 9/22* (2006.01)
*G05B 19/42* (2006.01)

(52) U.S. Cl. .................. 318/568.13; 318/565; 318/566; 318/567

(58) Field of Classification Search ............. 318/568.13, 318/565–567
See application file for complete search history.

(56) References Cited

FOREIGN PATENT DOCUMENTS

| | | | |
|---|---|---|---|
| EP | 0 429 835 | A1 | 6/1991 |
| EP | 1 087 279 | A2 | 3/2001 |
| WO | WO 2004/021094 | A1 | 3/2004 |

*Primary Examiner* — Walter Benson
*Assistant Examiner* — Erick Glass

(57) ABSTRACT

A method is disclosed for automatically determining an effective mass of a door system that is driven by a motor and has at least one door. In this case a speed change accomplished during an acceleration movement is established, and a force variable, for example the motor current or an armature voltage, influencing the drive force of the motor is summed or integrated during the acceleration movement. The effective door mass is established from the sum or the integral of the force variable and the speed change, the summation or the integration of the force variable being performed over a number of operating system cycles of a control device assigned to the door system. Also described is a control device for automatically determining the effective door mass, having a memory for force variable profiles that is designed in such a way that mass can be established for different force variable profiles in the memory in conjunction with an unchanged program code.

14 Claims, 2 Drawing Sheets

METHOD AND CONTROL DEVICE FOR AUTOMATICALLY DETERMINING A MASS OF A DOOR SYSTEM

CROSS REFERENCE TO RELATED APPLICATIONS

This application is the US National Stage of International Application No. PCT/EP2006/067337, filed Oct. 10, 2006 and claims the benefit thereof. The International Application claims the benefits of German application No. 10 2005 050 125.7 filed Oct. 18, 2005, both of the applications are incorporated by reference herein in their entirety.

FIELD OF INVENTION

The invention relates to a method for automatically determining a mass ($m_{eff}$) of a door system that is driven by a motor and has at least one door, a speed change accomplished during an acceleration movement being established, and a force variable influencing the drive force of the motor being summed or integrated during the acceleration movement, and the sum or the integral of the force variable and the speed change ($\Delta V$) being used to determine the mass ($m_{eff}$).

The term door is to be understood equally as a single door leaf, a double door leaf and a rolling door with closing and opening directions in any desired positions.

The invention also relates to a control device for automatically determining a mass of a door system that is driven by a motor and has at least one door.

BACKGROUND OF THE INVENTION

Such doors are applied, for example, as building doors, doors in trains or as elevator doors. The establishment of the effective elevator door mass and of the kinetic energy linked thereto is of great importance for safety reasons. In particular, there are regulations that limit the kinetic energy of a sliding door in closing movement to a specific Joule value in terms of apparatus.

Methods and apparatuses for automatically establishing door mass are known from EP 108 72 79 B1 and WO 2004/021094 A1. It is disadvantageous of the two methods that in the case, for example, of two-leaf doors with a very small opening width, only half an opening width is available for mass determination for a driving operation. This short distance is not sufficient for determining the mass with a required accuracy of less than 10%.

A further disadvantage is that the mass determination is not possible in an arbitrary operating movement for example during normal opening. For the present, it is necessary to change to a movement for establishing mass.

SUMMARY OF INVENTION

It is the object of the invention to simplify the generic method for mass determination such that it is possible to establish the mass during any desired movement without renouncing the accuracy of the establishment of the mass.

This object is achieved by virtue of the fact that, in accordance with the invention, in the case of a generic method in which a force variable influencing the drive force of the motor is summed or integrated during the acceleration movement, and the sum or the integral of the force variable and the speed change are used to determine the mass, the summation or integration of the force variable is performed over a number of operating system cycles ($\Delta t$) of a control device assigned to the door system.

According to the invention, it is now advantageous during an arbitrary movement, that is to say also during normal operation, to establish the door mass by means of the measured and, computationally, via at least two intervals or operating system cycles, without it happening that the movement properties of the door are influenced. Thus, it is possible to operate virtually with arbitrary movement profiles.

In an advantageous refinement of the invention, a current driving the motor, a motor voltage, in particular an armature voltage, and/or a pulse width modulation signal is/are used as force variable. Since the force variable such as a current driving the motor or a motor voltage, in particular an armature voltage, or else a pulse width modulation signal can be established simply, cost effectively and accurately by measurement, the simple establishment of the motor force variables is very advantageous for the inventive method.

It is expedient that the force variable is varied at the start of or/and during the acceleration movement. To date, it has been necessary to establish the mass via a constant current or a voltage jump, or via a constant motor voltage ramp. The door mass can now be determined with an accuracy of less than 10% by using a virtually arbitrary force variable profile, for example a sinusoidal profile. The accuracy is now essentially by the resolution of the values established such as, for example, the speed, the current or the voltage values.

In a further preferred refinement, a separate learning movement is executed outside the normal operation as acceleration movement. The advantage of learning movements that are possibly carried out at a time interval of approximately 1 year, is that the "aging" of the door system can be detected. For example, the friction in the sliding shoes can have increased owing to continuous operation, and thus the previously established value of an effective mass of the door system no longer corresponds to the present value of an effective mass. The change process is preferably logged in an associated automation system in a log file.

In an expedient and maintenance friendly refinement of the invention, a movement of the normal operation is used as acceleration movement, the mass of the door system being preferably automatically reestablished from time to time, for example once per week, during normal operation. The door mass can also be established during movement in normal operation by means of the inventive method, for example by applying an arbitrary profile for the force variable.

Consequently, it is also possible to take account, for example, of different temperature influences in the course of a day or a year.

In order to overcome static friction, it is expedient that before the acceleration movement the door system is driven at least in a creeping movement, at least a friction current flowing. Once the friction current $I_R$ has been established, the effective door mass can be established yet more accurately. The creeping movement is preferably defined by a speed of less than 10 cm/s.

A further enhancement of the accuracy of the establishment of mass is achieved by virtue of the fact that during the acceleration movement the acceleration firstly starts, beginning with the creeping movement, with a positive value from a first instant and then changes to the creeping movement again with a negative acceleration. By way of example, in a learning movement a ramp with a first gradient is applied over a specific time. The door system or the door is thereby accelerated. After this acceleration time, the door system or the door is braked by a second, negative gradient, which can be substantially steeper than the first gradient, until creeping movement is again achieved. This procedure has the particular advantage that even the masses of very light doors can be established within very small opening widths, and the door comes to rest again in good time before stopping at an end point.

It is expedient that a force constant of the motor is used to determine the mass. The force constant is derived from a torque constant of the motor transmitted into a translatory system.

It is expedient that the current to be summed or to be integrated is formed from a difference between a total current, particularly measured during the acceleration movement, and the friction current. It is considered to be advantageous that as an effective mass the determined mass includes components consisting of a translatory mass, a mass of a counterweight and/or a door mass.

It is advantageous for an alternative determination of the mass that as an effective mass the determined mass includes components consisting of a translatory mass, a mass equivalent to the spring force of a spring, and/or a door mass. Thus, it is possible to use this method to determine the mass of two different door systems, the point being that there are door systems that operate with a counterweight, and door systems that operate with a spring force of a spring.

It is, furthermore, expedient that the acceleration movement is achieved by an increase in the total current in particular beyond the friction current. The friction current is preferably measured in a separate movement for the purpose of establishing friction. In the simplest case, the current is increased until the door is set in movement.

It is advantageous for safe operation of the door that a kinetic energy of the door, in particular impact energy, is established by means of the mass. By establishing the impact energy, it is possible to set the door system or the motor force or the motor speed in such a way that the impact energy does not exceed a specific limit and therefore does not cause any injuries, for example in the case of malfunction.

According to the invention, the object is also achieved by the control device mentioned at the beginning for automatically determining a mass of a door system that is driven by a motor and has at least one door, preferably for carrying out the method as claimed in one of the method claims, having a first memory for storing a profile, characterizing an acceleration movement, of a force variable influencing the drive force of the motor, a second memory for storing a program code, and an arithmetic logic unit for establishing mass under programmed control, the memories and the arithmetic logic unit being designed in such a way that mass can be established for different force variable profiles in the first memory in conjunction with an unchanged program code. It is possible in this case for the two memories to be organized as different memory areas in a common memory chip.

BRIEF DESCRIPTION OF THE DRAWINGS

An exemplary embodiment for automatically determining a mass of a door system is explained in more detail with the aid of the figures.

DETAILED DESCRIPTION OF INVENTION

Figure 1:
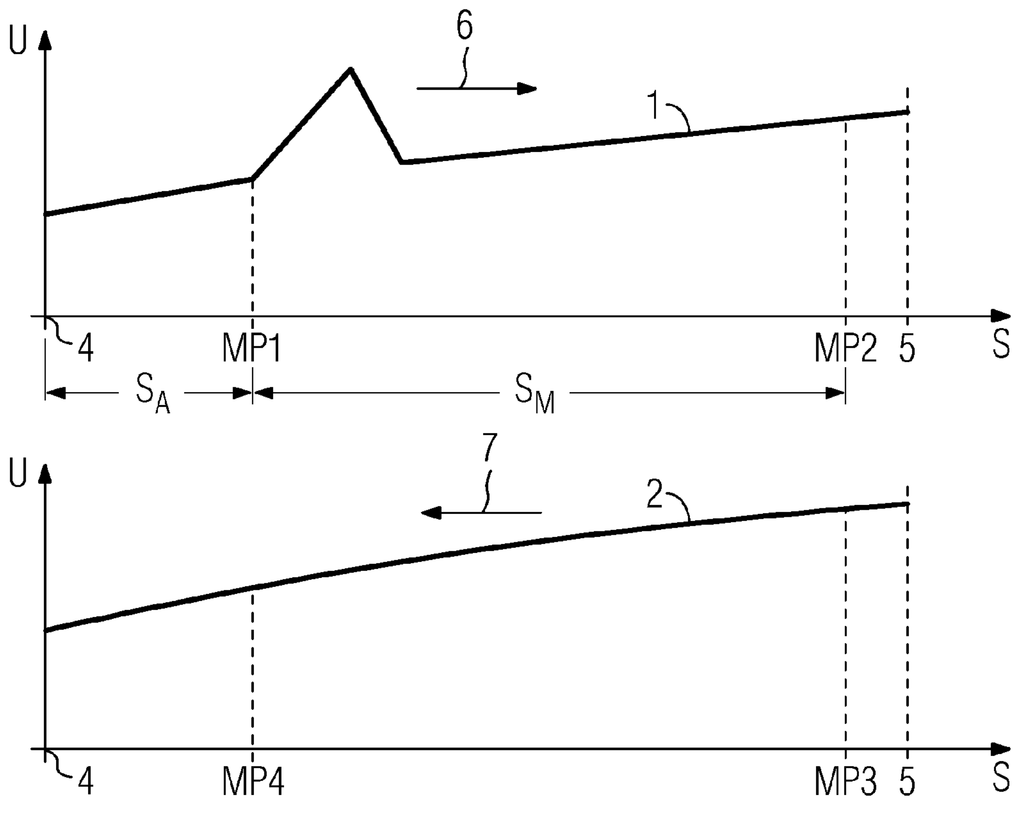
FIG. 1 shows a motor voltage profile as a function of distance.

FIG. 1 shows a motor voltage profile 1 and 2 for an electrically driven door with a mass $m_T$. A motor voltage U is respectively plotted over a movement distance S. The motor voltage profile 1 is illustrated over the movement distance S for a movement in the opening direction 6. The motor voltage profile 2 is illustrated over the movement distance S for a movement in the closing direction 7.

The door is closed at position 4, this corresponding to a movement distance S=0 mm. After a run up distance of preferably $S_A$=100 mm, starting from a first instant or measuring point MP1 a total current $I_G$ is measured for the movement distance of a motor voltage ramp present for 40 operating system cycles Δt with a gradient of one pulse width modulation increment per operating system cycle Δt. A motor current I is summed for this time duration. The motor current I is composed of the measured total current $I_G$ minus a friction current $I_R$, $I=I_G-I_R$. The door is completely open at position 5.

In order to establish the friction current $I_R$, measurement is carried out in the open direction 6 starting from the first measuring point MP1 in a separate learning movement in the case of which the motor voltage profile 1 has a continuous linear profile as against the illustration in the figure, that is to say without a ramp. The friction current $I_R$ is measured for a further 150 mm every 10 mm starting from a covered run up distance $S_A$=100 mm, and stored, and provided as a mean value for a later calculation to establish the mass.

The calculation represented in formula I:

$$m_{eff} = K\Phi\frac{\Delta t}{\Delta V}\sum_{i=1}^{40}(I_{Gi}I_R). \qquad \text{I}$$

is executed in order to determine effective mass $m_{eff}$ of the door in accordance with the invention.

The inventive method of calculation according to formula I results from the physical basic equation according to formula II and transformation of formula II into a summed representation according to formula III and the use of a motor force constant KΦ according to formulas IV and V.

$$\frac{dv}{dt} = a; \int dv = \int a\,dt. \qquad \text{II}$$

$$\Delta V = \sum_{\lambda} a_i \Delta t. \qquad \text{III}$$

$$K\Phi I_{Gi} = F_i;\ F = m\ a. \qquad \text{IV}$$

$$a_i = \frac{K\Phi \cdot I_i}{m}. \qquad \text{V}$$

Ultimately, the value for the speed change ΔV per operating system cycle is established via an incremental encoder on the motor. The incremental encoder provides pulses per time unit that are directly proportional to a current speed V.

The measured motor currents $I_G$ and $I_R$ and the speed V or the speed change ΔV established via the incremental encoder are inserted into formula I, and the effective door mass $m_{eff}$ can be determined.

In order to establish counterweights and/or to determine forces, the respective force is established with the aid of formula IV at the positions of the movement distance S that correspond to the measuring points MP1 to MP4.

If a spring is used in the door system for a counterforce, the greatest force $F_f$ of the spring occurs at the location of the positions or measuring points MP2 and MP3. A door system can be determined with the aid of a spring automatically, preferably solely on the basis of the elected measured values, without being analyzed by a service technician, by means of comparing the forces at the measuring points MP1 and MP4 with MP2 and MP3 in the case of a larger force at the positions MP2 and MP3 than at the positions MP1 and MP4.

For the case in which no spring is detected, a counterweight can be established as follows. The force $F_{MP2}$ at the position MP2 is composed according to formula VI of the friction force $F_R$ and the counterweight force $F_G$. Further additions of physical forces lead to formula IX in which the counterweight force $F_G$ is established.

1. $F_{MP2}=F_R+F_G$ VI.

2. $F_{MP3}=-F_R+F_G$ VII.

3. $F_{MP3}=-F_{MP2}+2\cdot F_G$ VIII.

4. $F_G=(F_{MP2}+F_{MP3})/2$ IX.

Since as an effective mass the determined mass $m_{eff}$ includes components consisting of a translatory mass $m_{lin}$, a mass $m_G$ of the counterweight and a mass equivalent to the spring force $F_F$, or a combination of the two, and a door mass $m_T$, the door mass $m_T$ is determined according to formula X.

1. $m_T=m_{eff}-m_{lin}-m_G$ X.

The following table shows measured values of the door determined via the inventive calculation in comparison with the actual measured values of the door. It is shown on the example of a door with an actual mass of 300 kg and a further door with an actual mass of 200 kg that the percentage deviation between the actual mass and the calculated mass is below 10%.

| | $m_T$ (Actual) [Kg] | $m_G$ (Actual) [Kg] | Measurement 1 $m_T$ (Established) [Kg] | Measurement 2 $m_T$ (Established) [Kg] | Measurement 3 $m_T$ (Established) [Kg] | Measurement 1 $m_G$ (Established) [Kg] | Measurement 2 $m_G$ (Established) [Kg] | Measurement 3 Percentage deviation | Measurement 1 Percentage deviation | Measurement 2 Percentage deviation | Measurement 3 Percentage deviation |
|---|---|---|---|---|---|---|---|---|---|---|---|
| Start left | 300 | 0 | 300 | 283 | 279 | 1 | 1 | 1 | 0 | −6 | −7 |
| Start right | 300 | 0 | 284 | 291 | 290 | 1 | 1 | 1 | −5 | −3 | −3 |
| Start left | 200 | 0 | 191 | 192 | 193 | 1 | 1 | 1 | −5 | −4 | −4 |
| Start right | 200 | 0 | 182 | 183 | 186 | 0 | 0 | 0 | −9 | −9 | −7 |

Current measurement: every 78 values/10 ms (averaging over all current values).
Mass determination via KΦ: KΦ = 18.4 N/A The calculated values result from in each case three measurements in which respectively 78 measured current values per 10 ms are evaluated. In addition, one measurement movement each of the door is carried out at a start from a left-hand side and from a right-hand side. The effective mass component of motor and system or the translatory mass is 10 kg.

Figure 2:
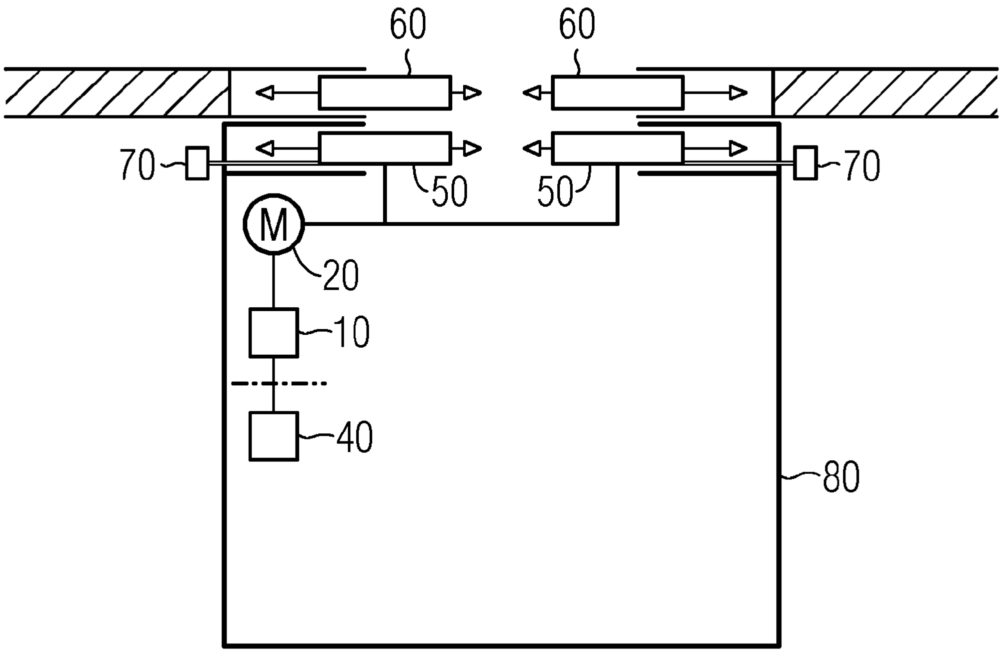
FIG. 2 schematically shows a door system.

FIG. 2 shows a door system 100 of an elevator in a schematic representation. The door system 100 includes a door control device 10 which is connected to a motor 20 and to a hand terminal 40. Further, the door system 100 includes a two-part cabin door 50 and balancing weights 70. Landing doors 60, which are arranged at various floors, are mechanically connected to the cabin door 50 of the elevator car 80.

Figure 3:
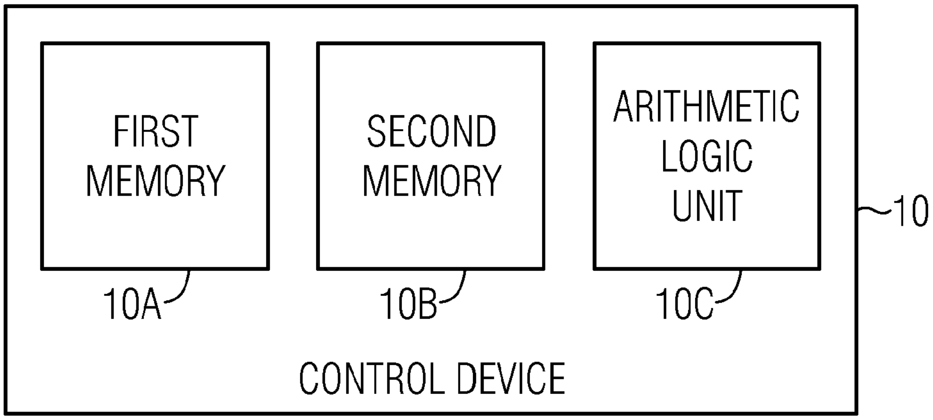
FIG. 3 schematically shows a control device.

FIG. 3 shows the control device 10 in a schematic representation, wherein the control device 10 includes a first memory 10A, a second memory 10B and an arithmetic logic unit 10C. The first memory 10A stores a profile of a force variable influencing the drive force of the motor 20, wherein the profile characterizes an acceleration movement, and wherein a plurality of operating system cycles of the door system 100, which comprises at least one cycle during normal operation of the door system 100, is used for generating the profile. The second memory 10B stores a program code. The arithmetic logic unit 10C determines a mass under programmed control, wherein the first and second memories 10A and 10B and the arithmetic logic unit 10C are configured such that mass is established for different force variable profiles in the first memory 10A in conjunction with an unchanged program code.

The invention claimed is:

1. A method for automatically determining a mass of a door system driven by a motor and having a door, comprising:

accomplishing a speed change during an acceleration movement of the door system;

integrating a force variable that influences a drive force of the motor during the acceleration movement;

determining the mass of the door system via an integral of the force variable, wherein an integration of the force variable is performed over a plurality of operating system cycles of a control device assigned to the door system, and wherein the plurality of operating system cycles comprises at least one cycle during normal operation of the door system.

2. The method as claimed in claim 1, wherein the force variable is selected from the group consisting of: a current driving the motor, an armature voltage, a pulse width modulation signal and combinations thereof.

3. The method as claimed in claim 1, wherein the force variable is varied at the start of and during the acceleration movement.

4. The method as claimed in claim 1, wherein a separate learning movement is executed outside the normal operation as acceleration movement.

5. The method as claimed in claim 1, wherein a movement of the normal operation is used as acceleration movement, the mass of the door system being periodically automatically reestablished during normal operation.

6. The method as claimed in claim 1, wherein before the acceleration movement the door system is driven at least in a creeping movement and at least a friction current flowing.

7. The method as claimed in claim 1, wherein during the acceleration movement the acceleration starts, beginning with a creeping movement with an initial positive acceleration and then changes to the creeping movement with a negative acceleration.

8. The method as claimed in claim 1, wherein the mass is determined via a force constant of the motor.

9. The method as claimed in claim 8, wherein the force constant is derived from a torque constant of the motor transmitted into a translatory system.

10. The method as claimed in claim 9, wherein the current to be summed or to be integrated is formed from a difference between the total current and the friction current.

11. The method as claimed in claim 10, wherein as an effective mass, the determined mass includes components selected from the group consisting of: a translatory mass, a mass of a counterweight, a door mass, a mass equivalent to a spring force of a spring and combinations thereof.

12. The method as claimed in claim 10, wherein the acceleration movement is achieved by an increase in the total current beyond the friction current.

13. The method as claimed in claim 1, wherein an impact energy is established via use of the mass of the door system.

14. A control device for automatically determining a mass of a door system driven by a motor and having at least one door, comprising:

a first memory that stores a profile of a force variable influencing the drive force of the motor, wherein the profile characterizes an acceleration movement, wherein a plurality of operating system cycles of the door system, which comprises at least one cycle during normal operation of the door system, is used for generating the profile;

a second memory that stores a program code; and an arithmetic logic unit that determines a mass under programmed control, wherein the first and second memories and the arithmetic logic unit are configured such that mass is established for different force variable profiles in the first memory in conjunction with an unchanged program code.

* * * * *